United States Patent
Han et al.

(10) Patent No.: US 12,322,357 B2
(45) Date of Patent: Jun. 3, 2025

(54) ELECTRONIC DEVICE AND PROCESSING METHOD

(71) Applicant: Lenovo (Beijing) Limited, Beijing (CN)

(72) Inventors: Shuang Han, Beijing (CN); Xiaoxi Chen, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 18/435,097

(22) Filed: Feb. 7, 2024

(65) Prior Publication Data

US 2024/0290296 A1    Aug. 29, 2024

(30) Foreign Application Priority Data

Feb. 28, 2023   (CN) .......................... 202310194533.7

(51) Int. Cl.
*G09G 5/00*    (2006.01)
*G06F 3/14*    (2006.01)

(52) U.S. Cl.
CPC .......... *G09G 5/006* (2013.01); *G06F 3/1454* (2013.01); *G09G 2370/20* (2013.01)

(58) Field of Classification Search
CPC ... G09G 5/006; G09G 2370/20; G06F 3/1454
USPC ........................................ 345/204
See application file for complete search history.

(56) References Cited

U.S. PATENT DOCUMENTS

2018/0316939 A1* 11/2018 Todd ................ H04N 21/21805
2020/0374486 A1* 11/2020 Ceekala ........... H04N 21/41422

* cited by examiner

*Primary Examiner* — Mark Edwards
(74) *Attorney, Agent, or Firm* — ANOVA LAW GROUP, PLLC

(57) ABSTRACT

A first device includes an image acquisition unit configured to acquire first image data, a first interface configured to connect with a second device and receive at least second image data sent by the second device, and a second interface configured to connect with a third device and send data including at least the first image data and the second image data to the third device. The second image data include image data collected by an image acquisition unit of the second device.

19 Claims, 5 Drawing Sheets

ELECTRONIC DEVICE AND PROCESSING METHOD

CROSS-REFERENCE TO RELATED APPLICATION

The present disclosure claims priority to Chinese Patent Application No. 202310194533.7, filed on Feb. 28, 2023, the content of which is incorporated herein by reference in its entirety.

TECHNICAL FIELD

The present disclosure generally relates to the field of electronic device and, more particularly, to an electronic device and a processing method thereof.

BACKGROUND

An electronic device often has an image acquisition unit. When multiple electronic devices are present, the image data collected by an electronic device through its own image acquisition unit may only interact with a data processing device, resulting in a relatively simple interactive function of the electronic device.

SUMMARY

In accordance with the present disclosure, there is provided a first device. The first device includes an image acquisition unit configured to acquire first image data, a first interface configured to connect with a second device and receive at least second image data sent by the second device, and a second interface configured to connect with a third device and send data including at least the first image data and the second image data to the third device. The second image data include image data collected by an image acquisition unit of the second device.

Also in accordance with the present disclosure, there is provided a processing method applied to a first device. The method includes collecting first image data through the first device, receiving second image data sent by the second device, and sending data including the first image data and the second image data to a third device.

Also in accordance with the present disclosure, there is provided a non-transitory computer-readable storage medium storing instructions that, when executed by one or more processors, cause the one or more processors to collect first image data through the first device, receive second image data sent by the second device, and send data including the first image data and the second image data to a third device.

BRIEF DESCRIPTION OF THE DRAWINGS

In order to more clearly illustrate the technical solutions of the embodiments of the present disclosure, the drawings consistent with the description of the embodiments will be briefly described hereinafter. Apparently, the drawings in the following description are merely some embodiments of the present disclosure. Those of ordinary skill in the art may also obtain other drawings based on these drawings without exerting creative efforts.

DETAILED DESCRIPTION

To make the objective, technical solutions, and advantages of the present disclosure clearer, the technical solutions in the embodiments of the present disclosure will be clearly and thoroughly described below in conjunction with the accompanying drawings. Apparently, the described embodiments are only part but not all of the embodiments of the present disclosure. Based on the embodiments in the present disclosure, all other embodiments derived by those of ordinary skill in the art without creative efforts still fall within the scope of protection of the present disclosure. The embodiments and features in the embodiments in the present disclosure may be arbitrarily combined if there is no conflict. The steps illustrated in the flowcharts of the figures may be performed in a computer system, such as a set of computer-executable instructions. Also, although a logical order is shown in the flowchart diagrams, under certain circumstances, the steps shown or described in the flowcharts may be performed in other different orders.

The technical solutions of the present disclosure will be further described in detail hereinafter with reference to the accompanying drawings and specific embodiments.

Figure 1:
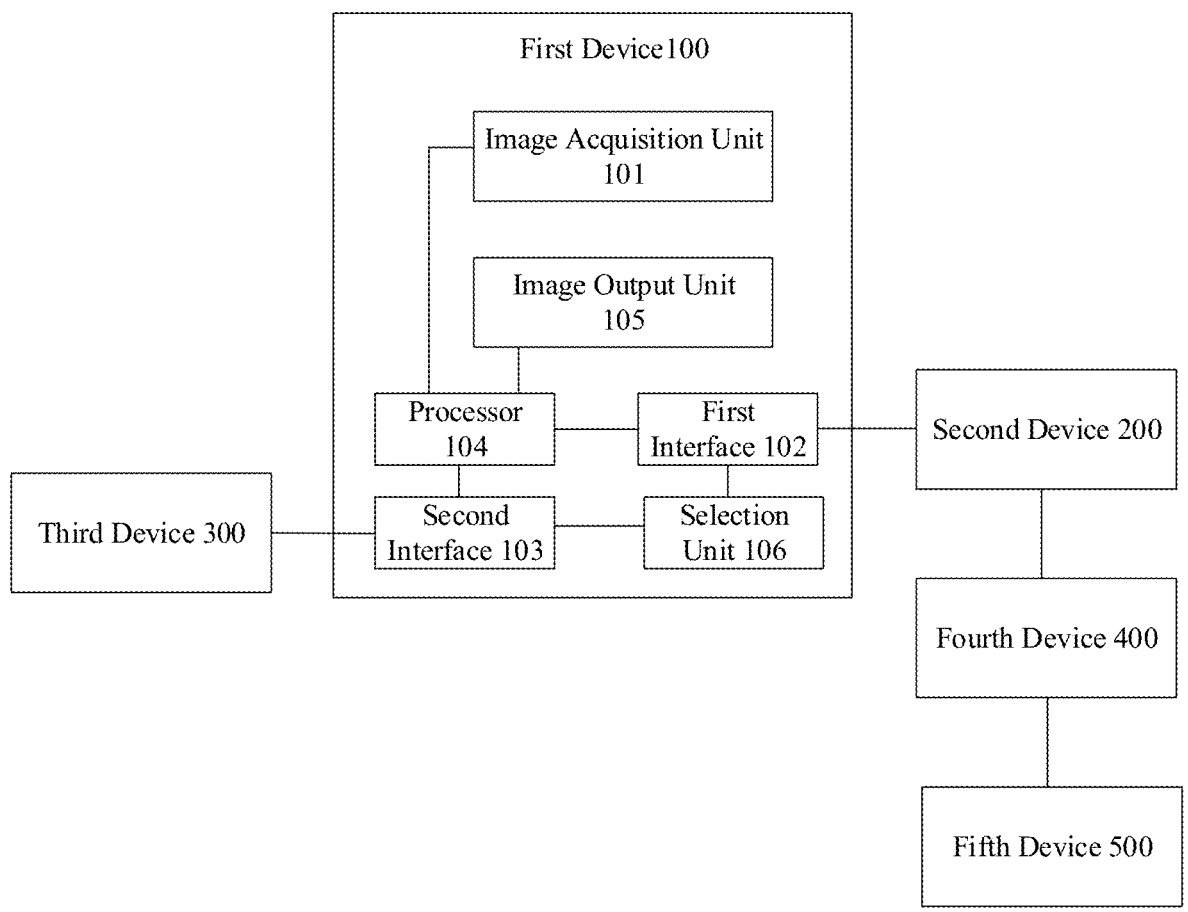
FIG. 1 is a schematic structural diagram of a first device, in accordance with embodiments of the present disclosure.

FIG. 1 is a schematic structural diagram of a first device, in accordance with embodiments of the present disclosure. As shown in FIG. 1, the first device 100 includes an image acquisition unit 101, a first interface 102, and a second interface 103. The image acquisition unit 101 is configured to collect first image data. The first interface 102 is configured to connect with a second device 200 and receive at least second image data sent by the second device 200. The second image data includes image data for a second image collected by the image acquisition unit of the second device 200. The second interface 103 is configured to connect with a third device 300 and send data including at least the first image data and the second image data to the third device 300.

In some embodiments, both the first interface 102 and the second interface 103 may be a Universal Serial Bus (USB) interface, such as a USB-C interface. In some embodiments, the first interface 102 and the second interface 103 may be a display interface (DP), a Thunderbolt interface (Thunderbolt), or a High Definition Multimedia Interface (HDMI), etc.

In some embodiments, the first device, the second device, and the third device may be of the same type, such as monitors.

In some embodiments, the first device, the second device, and the third device may also be of different types. For example, the first device and the second device are monitors, and the third device is a device for generating or processing media data.

An electronic device provided by the present disclosure may not only perform data interaction with a device that generates or processes media data, but may also perform data interaction with a monitor, which not only expands the functionality of the electronic device, but also expands the interaction range of the electronic device.

In the present disclosure, the first device 100 may also include a processor 104, which is configured to merge the first image data and the second image data to obtain third image data. Alternatively, the processor 104 may also be configured to combine the first image data and the second image data to obtain the third image data.

In some embodiments, image data merging refers to merging multiple independent images into one image that cannot be directly split into the original independent images. For example, independent first image data and independent second image data are merged into one piece of third image data. The third image data is an independent image, and the third image data cannot be split into independent first image data and second image data.

In some embodiments, image data combination refers to combining multiple independent images into one image group, where each image still has relative independence. The image group may be dissolved and restored to the original independent images. For example, independent first image data and independent second image data are combined into third image data. The third image data is an image data group, and the third image data may be split into independent first image data and second image data.

It should be noted that the processor 104 is different from a central processing unit (CPU) on a device with media data processing capabilities. The difference lies in that the processor 104 implements image processing and encoding and decoding through hardware. That is, processor 104 is a processor with hardware image processing capabilities and hardware encoding and decoding capabilities, while the CPU implements image processing and encoding and decoding through software.

In the present disclosure, the first device 100 may specifically send the third image data to the third device 300 through the second interface 103.

In some embodiments, when the third device 300 is of the same type as the first device 100, the third device 300 may merge or combine the third image data with the image data collected by itself and then send the merged or combined image data to a lower-level electronic device connected to the third device 300. Alternatively, the third image data is directly forwarded to a lower-level electronic device connected to the third device 300.

In some embodiments, when the third device 300 is of a different type from the first device 100, the third device 300 may send the third image data to a remote device connected to the third device, so that the third image data may be output to the display screen of the remote device for display.

In the present disclosure, the second image data sent by the second device 200 and received by the first device 100 through the first interface 102 may also include the image data sent by a fourth device 400 and received by the second device 200. The image data sent by the fourth device 400 includes at least image data collected by an image acquisition unit of the fourth device 400.

In some embodiments, the second image data may be combined data of the image data collected by the image acquisition unit of the second device 200 and the image data received by the second device 200 and sent from the fourth device 400. In some embodiments, the second image data may be merged image data of the image data collected by the image acquisition unit of the second device 200 and the image data received by the second device 200 and sent from the fourth device 400. When the second image data is the combined data of the image data collected by the image acquisition unit of the second device 200 and the image data received by the second device 200 and sent from the fourth device 400, the processor 104 of the first device 100 may be configured to merge the first image data, the image data collected by the image acquisition unit of the second device 200 and the image data collected by the image acquisition unit of the fourth device 400 to obtain the third image data. When the second image data is the merged data of the image data collected by the image acquisition unit of the second device 200 and the image data received by the second device 200 and sent from the fourth device 400, the processor 104 of the first device 100 may be configured to merge the first image data and the second image data to obtain the third image data.

In the present disclosure, the image data sent by the fourth device 400 may also include the image data sent by a fifth device 500 and received by the fourth device 400, where the image data sent by the fifth device 500 may include at least the image data collected by the image acquisition unit of the fifth device 500.

In some embodiments, the image data sent by the fourth device 400 may be combined data of the image data collected by the image acquisition unit of the fourth device 400 and the image data sent by the fifth device 500 and received by the fourth device 400. In some embodiments, the image data sent by the fourth device 400 may be merged data of the image data collected by the image acquisition unit of the fourth device 400 and the image data received by the fourth device 400 and sent from the fifth device 500. When the image data sent by the fourth device 400 is the combined data of the image data collected by the image acquisition unit of the fourth device 400 and the image data sent by the fifth device 500 and received by the fourth device 400, the processor 104 may be configured to merge the first image data, the image data collected by the image acquisition unit of the second device 200, the image data collected by the image acquisition unit of the fourth device 400, and the image data collected by the image acquisition unit of the fifth device 500, to obtain the third image data. When the image data sent by the fourth device 400 is the merged data of the image data collected by the image acquisition unit of the fourth device 400 and the image data sent by the fifth device 500 and received by the fourth device 400, this processor 104 may be configured to merge the first image data and the second image data to obtain the third image data. Here, the second image data is the merged data of the image data collected by the image acquisition unit of the second device 200 and the image data sent by the fourth device. The image data sent by the fourth device is the merged data of the image data collected by the image acquisition unit image data of the fourth device 400 and the image data collected by the image acquisition unit of the fifth device 500.

In the present disclosure, the first device 100 may also have an image output unit 105, through which the first image data and/or the second image data may be output, or at least part of the first image data and/or the second image data may be output.

In some embodiments, the image output unit 105 may be a display screen, and the first device 100, the second device 200, the fourth device 400, and the fifth device 500 may all be monitors, and the first device 100, the second device 200, the fourth device 500, and the fifth device 500 may all have the similar architecture. In some embodiments, the third device 300 may be a computer.

A monitor provided by the present disclosure may not only have computing capacities, but also have hardware data processing capabilities and hardware encoding and decoding capabilities. In addition, through device cascading (i.e., serial connection), in the present disclosure, the first device may receive image data sent by an upper-level device (e.g., the second device), and may also send image data collected by a device itself and image data sent by an upper-level device (e.g., the second device) to a lower-level device (e.g., the third device). The first device may receive data sent by a lower-level device (e.g., the third device), and may also send data from the third device to an upper-level device (e.g., the second device). In this way, the third device may obtain the camera image data of any device on the cascade linkage as needed to meet a user's requirements for images from different angles.

In some embodiments, the first device may also have multiple first interfaces 102. The second device 200, the fourth device 400, and the fifth device 500 may all be directly connected to the first device 100 through a respective first interface 102. The first device 100 may directly receive the image data collected by the image acquisition unit of the second device 200, the fourth device 400, and the fifth device 500, and may also combine or merge the image data collected by its own image acquisition unit 101 with the image data sent by the second device 200, the fourth device 400, and/or the fifth device 500, which are then sent to the third device 300.

In the present disclosure, the first device 100 further includes a selection unit 106 for determining a target device among candidate devices in response to a selection instruction. The candidate devices include at least the first device 100, the second device 200 and the fourth device 400 connected to the second device 200. The candidate devices may also include the fifth device 500 and more cascaded devices (not shown). The second image data may be combined data of the image data collected by the image acquisition unit of the second device 200 and the image data sent by the fourth device 400. The image data sent by the fourth device 400 includes at least the image data collected by the image acquisition unit of the fourth device 400. The second interface 103 is configured to send image data corresponding to the target device to the third device 300.

In some embodiments, the second interface 103 is further configured to receive a selection instruction sent by the third device 300, where the selection instruction at least carries a device identifier. The selection unit 106 is further configured to send an image acquisition instruction to the second device 200 through the first interface 102 based on the device identifier, so that the second device 200 performs image acquisition through the image acquisition unit of the second device 200 based on the device identifier included in the image acquisition instruction. Additionally or alternatively, the selection unit 106 is configured to send an image acquisition instruction to the fourth device 400 through the second device 200 based on the device identifier, so that the fourth device 400 performs image acquisition through the image acquisition unit of the fourth device 400 based on the device identifier included in the image acquisition instruction. At this point, the second device 200 may be used as a relay device between the first device 100 and the fourth device 400 and only forward data between the first device 100 and the fourth device 400.

In some embodiments, the selection unit 106 may be an input device such as a touch screen, a physical button, or a microphone. The selection unit 106 may also be a software module implemented by part of the code integrated into the processor 104.

When the selection unit 106 is an input device, the first device 100 may also receive a menu opening instruction implemented through the selection unit 106. Through the menu opening instruction, a menu interface for device selection may be displayed in the display area of the first device 100. Then, a selection instruction for a candidate device in the menu interface may also be received through the selection unit 106, and the target device may be determined from the candidate devices based on the device identifier included in the selection instruction.

For example, by pressing a physical button on the first device 100, a menu interface for device selection may pop up in the display area of the first device 100. By pressing the physical button again, a user may select a target device from the multiple candidate devices displayed in the menu interface.

In some embodiments, the first device 100 may also receive display data sent from the third device when receiving a menu opening instruction through the selection unit. In this case, the menu opening instruction may have a higher priority than the display data. The first device 100 may preferentially display the target menu interface in the display area due to the higher priority of the menu opening instruction. Apparently, the first device may also display both the target menu interface and the display data in the display area. At this moment, since the menu opening instruction has a higher priority than the display data, at least part of the content of the display data may be blocked by the target menu interface.

In some embodiments, when the selection unit is a software module of the processor, the first device may also include an input device through which a menu opening instruction may be received. A menu interface for device selection may be displayed in the display area based on the menu opening instruction. In some embodiments, the first device may also receive a selection operation for multiple candidate devices in the menu interface, and the processor may determine a target device by identifying the device identifier included in the selection operation.

In some embodiments, the first device may display a menu interface on the display screen through an on-screen display (OSD) method to achieve the selection of the target device.

Through device cascading, the first device provided by the present disclosure not only has the ability to select data, but also allows the third device to access the camera image data of any device on the cascade linkage according to user needs, to meet different needs of users.

In some embodiments, the first device 100 may send data including the first image data and the second image data to the third device 300 through a first data channel of the second interface 103. The first device 100 may also receive the first display data sent by the third device 300 through a second data channel of the second interface 103, so that the first display data is displayed on the image output unit 105.

In some embodiments, the first display data may originate from the image data sent by a remote device and received by the third device 300, or may be image data stored by the third device 300 itself.

In some embodiments, the first device 100 may also receive the second image data sent by the second device 200 through a first data channel of the first interface 102, and send second display data to the second device 200 through a second data channel of the first interface 102, so that the second display data may be displayed on an image output unit of the second device 200. In some embodiments, the first display data includes the second display data.

In one embodiment, the second display data sent by the first device 100 to the second device 200 through the first interface 102 is the same as the first display data. For example, the second display data is all data of the first display data.

In another embodiment, the second display data sent by the first device 100 to the second device 200 through the first interface 102 is different from the first display data. For example, the second display data is part of the first display data.

In some embodiments, the first display data may also include multiple sub-display data, each sub-display data having a corresponding identifier. The identifier here is configured to indicate the display order of each sub-display data on a corresponding device.

In one example, the first display data includes three sub-display data. The identifier corresponding to the first sub-display data is 1, indicating that the first sub-display data is displayed first; the identifier corresponding to the second sub-display data is 3, indicating that the second sub-display data is displayed third; and the identifier corresponding to the third sub-display data is 2, indicating that the third sub-display data is displayed second.

In some embodiments, the processor 104 may determine the first sub-display data among the plurality of sub-display data based on the identifier for the first sub-display data, and display the first sub-display data through the image output unit 105.

Here, the first device may be in a position to display sub-display data first, and the identifier of the first sub-display data indicates that the first sub-display data is displayed first, which then directs to the first device.

Next, the first device 100 may send the remaining sub-display data of the plurality of sub-display data except for the first sub-display data to the second device 200 through the first interface 102, so that the second device 200 displays the corresponding second sub-display data in the remaining sub-display data through the image output unit of the second device 200 based on the identifier. Alternatively, through the second device 200, the first device 100 may send the remaining sub-display data to the fourth device 400 connected to the second device 200, so that the fourth device 400 displays the corresponding third sub-display data in the remaining sub-display data through the image output unit of the fourth device 400 based on the identifier.

In one example, the second device 200 is in a position to display sub-display data second, and the fourth device 400 is in a position to display sub-display data third. The first display data includes two sub-display data, where the identifier corresponding to the first sub-display data is 1, indicating that the first sub-display data is displayed first, which is then output for display through the first device 100. The identifier corresponding to the second sub-display data is 2, indicating that the second sub-display data is displayed second, which is then output for display through the second device 200. If the identifier corresponding to the second sub-display data is 3, indicating that the second sub-display data is displayed third, the second sub-display data is forwarded to the fourth device 400 through the second device 200, so that the fourth device 400 displays the output second sub-display data.

In some embodiments, when data is forwarded through the second device 200, the data sent by the first device 100 to the second device 200 may include an identifier, and the second device 200 may determine, whether to output the data through its own device or to forward the data according to the identifier.

In one example, the first device, the second device, and the fourth device are connected in a cascade manner. The first device may send the second sub-display data including the identifier 3 to the second device 200 through the first interface 102. After receiving the second sub-display data including the identifier 3, the second device 200 may compare the identifier with its own assigned position identifier. If the comparison result indicates a difference, the second device 200 may then send the second sub-display data including the identifier 3 to the fourth device 400. The fourth device 400 displays the output second sub-display data. That is, at this moment, the second device 200 only forwards the second sub-display data and does not display the data.

In some embodiments, the third device 300 may be a mobile phone, a computer, an information transceiver device, a tablet device, a personal digital assistant or other terminals. The third device 300 may include at least one processor, memory, at least one network interface, and input and output devices. The various components in the third device 300 are coupled together through a bus system. It may be understood that the bus system is configured to implement connection communication between these components. In addition to the data bus, the bus system may also include a power bus, a control bus, and a status signal bus.

The input and output devices may include a monitor, camera, keyboard, mouse, trackball, click wheel, keys, buttons, touchpad or touch screen, etc.

It may be understood that the memory may be a volatile memory or a non-volatile memory, and may also include both volatile and non-volatile memories. The non-volatile memory may be a Read Only Memory (ROM), Programmable Read-Only Memory (PROM), Erasable Programmable Read-Only Memory (EPROM), Electrically Erasable Programmable Read-Only Memory (EEPROM), Magnetic Random Access Memory (FRAM), flash memory, magnetic surface memory, optical disk, or Compact Disc Read-Only Memory (CD-ROM), etc. The magnetic surface memory may be a magnetic disk memory or a tape memory. Volatile memory may be Random Access Memory (RAM), which is used as an external cache. By way of illustration, but not limitation, many forms of RAM are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Direct Rambus Random Access Memory (DRRAM), etc. The memories described in the embodiments of the present disclosure are intended to include, but are not limited to, these and any other suitable types of memories.

The memory in the embodiment of the present disclosure is configured to store various types of data to support the operation of the third device 300. Examples of these data include any computer programs configured to execute on the third device 300, such as operating systems and applications, contact data, phonebook data, messages, pictures, audio, etc.

The operating system includes various system programs, such as a framework layer, core library layer, driver layer, etc., which are configured to implement various basic services and process hardware-based tasks. Applications may include various applications, such as media players, browsers, etc., configured to implement various application services. The programs for implementing the methods of the embodiment of the present disclosure may be included in the application program.

In some embodiments, the processor may be an integrated circuit chip with signal-processing capabilities.

In an exemplary embodiment, the third device 300 may be one or more of an Application Specific Integrated Circuit (ASIC), Digital Signal Processor (DSP), Programmable Logic Device (PLD), Complex Programmable Logic Device (CPLD), Field-Programmable Gate Array (FPGA), general-purpose processor, controller, Micro Controller Unit (MCU), microprocessor, or other electronic components.

The first device provided by the present disclosure may have the functions of a daisy chain and reverse daisy chain at the same time through device cascading, and may also choose to transmit part of the data or all the data to an upper-level device or a lower-level device.

Figure 2:
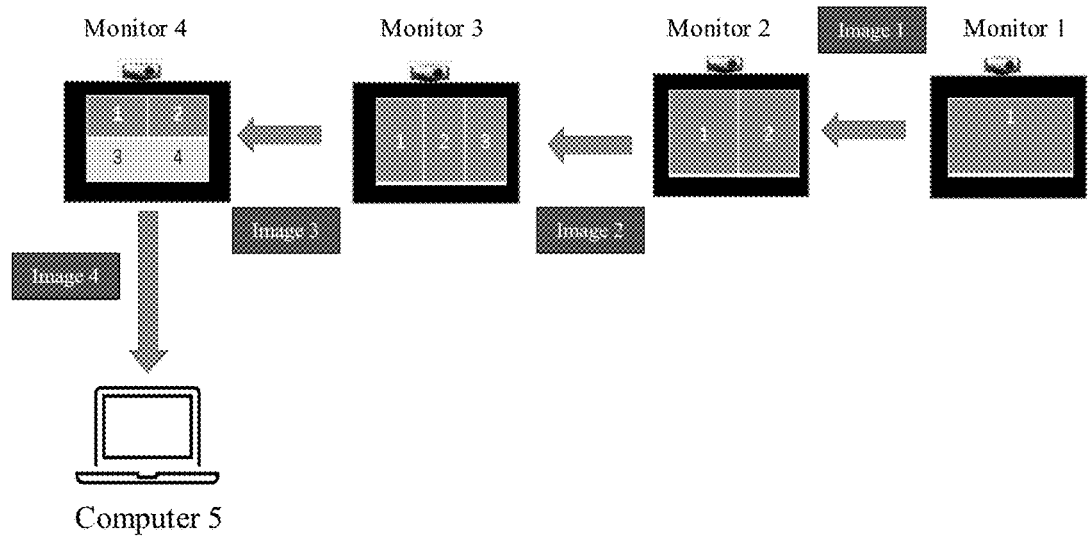
FIG. 2 is a schematic diagram of an application scenario of electronic devices, in accordance with embodiments of the present disclosure.

FIG. 2 is a schematic diagram of an application scenario of electronic devices, in accordance with embodiments of the present disclosure. As shown in FIG. 2, the electronic devices include four monitors, namely monitor 1, monitor 2, monitor 3, and monitor 4, where monitor 1, monitor 2, monitor 3, and monitor 4 are all connected in sequence through USB interfaces, and monitor 4 is also connected to computer 5 through a USB interface.

In some embodiments, each monitor has a camera through which image acquisition is possible. Monitor 1 may send image 1 collected by the camera of monitor 1 to monitor 2. Monitor 2 may merge the image collected by the camera of monitor 2 with image 1 to form image 2 and send image 2 to monitor 3. Monitor 3 may merge the image collected by the camera of monitor 3 with image 2 sent by monitor 2 to form image 3 and send image 3 to monitor 4. Monitor 4 may merge the image collected by the camera of monitor 4 with image 3 sent by monitor 3 to form image 4 and send image 4 to computer 5. In other words, each monitor may merge the image collected by its own camera with an image sent by an upper-level monitor and then send the merged image to a lower-level monitor/device. In this way, computer 5 may obtain the image data collected by the cameras of all monitors.

In some embodiments, computer 5 may be connected to a remote device (not shown), and image 4 may be also sent to the remote device through a connection, so that image 4 may be displayed on the remote device. For example, in a remote conference scenario, the remote device may display images collected by the cameras of the four monitors from different angles.

Figure 3:
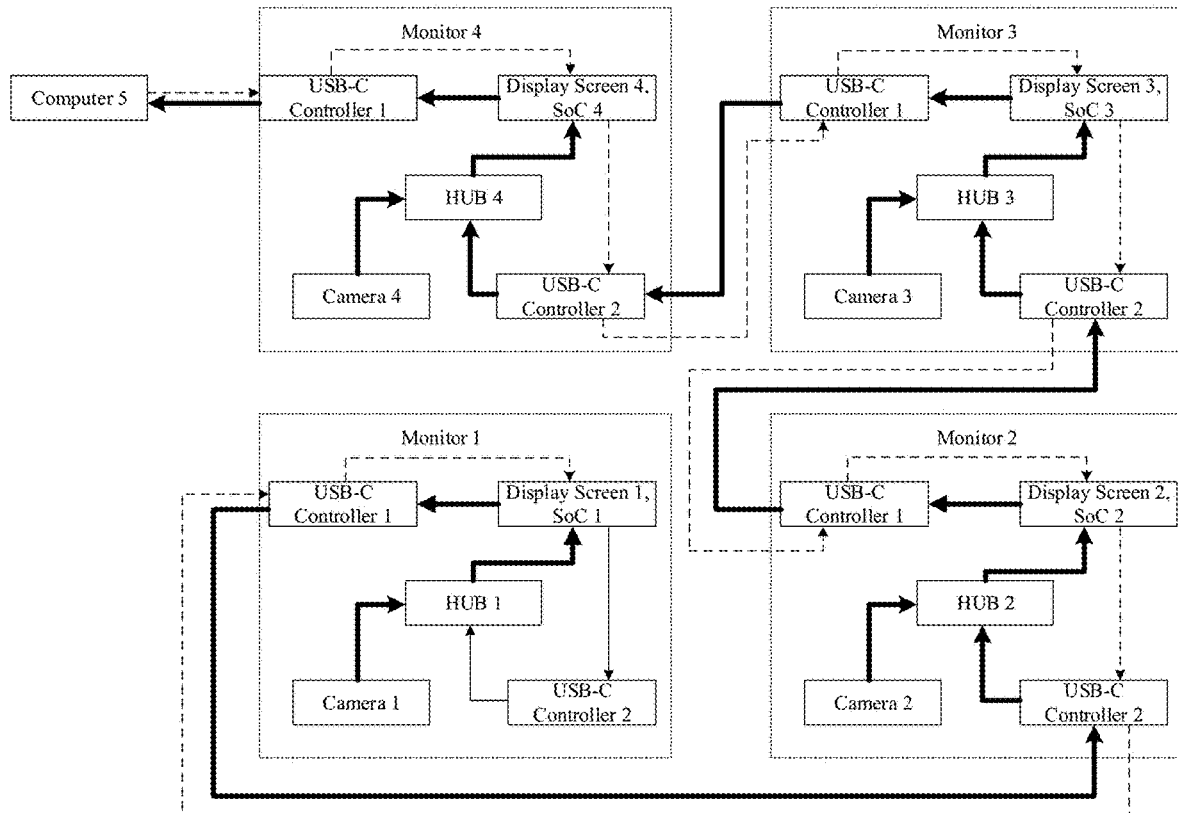
FIG. 3 is a schematic diagram of an architecture corresponding to FIG. 2.

FIG. 3 is a schematic diagram of an architecture corresponding to FIG. 2. As shown in FIG. 3, camera 1 of monitor 1 collects an image and sends the collected image 1 to the hub HUB 1. HUB 1 sends image 1 to the processor SoC 1. SoC 1 sends image 1 to USB-C controller 2 of monitor 2 through USB-C controller 1. USB-C controller 2 of monitor 2 sends image 1 to HUB 2 of monitor 2. Camera 2 of monitor 2 collects an image and sends the collected image to HUB 2. HUB 2 sends both the collected image and received image 1 to the processor SoC 2. SoC 2 merges the image collected by camera 2 with image 1 to obtain image 2, and sends image 2 to USB-C controller 2 of monitor 3 through USB-C controller 1 of monitor 2. USB-C controller 2 of monitor 3 sends image 2 to HUB 3 of monitor 3. Camera 3 of monitor 3 collects an image, and sends the collected image to HUB 3. HUB 3 sends both the collected image and image 2 to the processor SoC 3. SoC 3 merges the image collected by camera 3 with image 2 to obtain image 3, and sends image 3 to USB-C controller 2 of monitor 4 through the USB-C controller 1 of monitor 3. USB-C controller 2 of monitor 4 sends image 3 to HUB 4 of monitor 4. Camera 4 of monitor 4 collects an image, and sends the collected image to HUB 4. HUB 4 sends both the collected image and image 3 to the processor SoC 4. SoC 4 merges the image collected by camera 4 with image 3 to obtain image 4, and sends image 4 to computer 5 through the USB-C controller 1 of monitor 4.

The thick black line in FIG. 3 represents the image data transmitted from the monitors to the computer, and the dotted line represents the data sent from computer 5 to the monitors. The thin black line indicates that if the identifier included in the camera selection instruction sent by computer 5 to monitor 4 is the camera corresponding to monitor 1, the selection instruction needs to be sent to the USB-C controller 2 of monitor 1 through SoC 1 of monitor 1. The HUB1 is then controlled through the USB-C controller 2 of monitor 1 to send an image collected by camera 1 to the SoC1.

Figure 4:
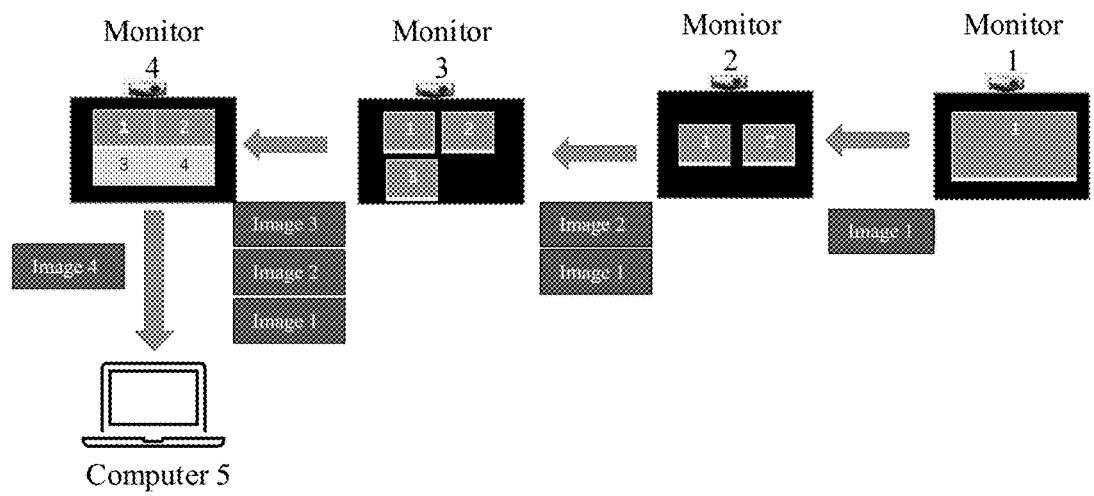
FIG. 4 is a schematic diagram of another application scenario of electronic devices, in accordance with embodiments of the present disclosure.

FIG. 4 is a schematic diagram of another application scenario of electronic devices, in accordance with embodiments of the present disclosure. As shown in FIG. 4, the electronic devices include four monitors, namely monitor 1, monitor 2, monitor 3, and monitor 4, where monitor 1, monitor 2, monitor 3, and monitor 4 are all connected in sequence through USB interfaces, and monitor 4 is also connected to computer 5 through a USB interface.

In some embodiments, each monitor has a camera through which image acquisition is possible. Monitor 1 may send image 1 collected by the camera of monitor 1 to monitor 2. Monitor 2 may send image 2 collected by the camera of monitor 2 together with image 1 to monitor 3. Monitor 3 may send image 3 collected by the camera of monitor 3 and image 1 and image 2 sent by monitor 2 to monitor 4. Monitor 4 may merge the image collected by the camera of monitor 4 with image 1, image 2, and image 3 sent by monitor 3 to form image 4 and send image 4 to computer 5. In this way, computer 5 may obtain the image data collected by the cameras of all displays.

In some embodiments, computer 5 may also be connected to a remote device (not shown), through which image 4 may be sent to the remote device, so that image 4 may be displayed on the remote device. This allows the remote device to display images collected by the cameras of four monitors from different angles.

Figure 5:
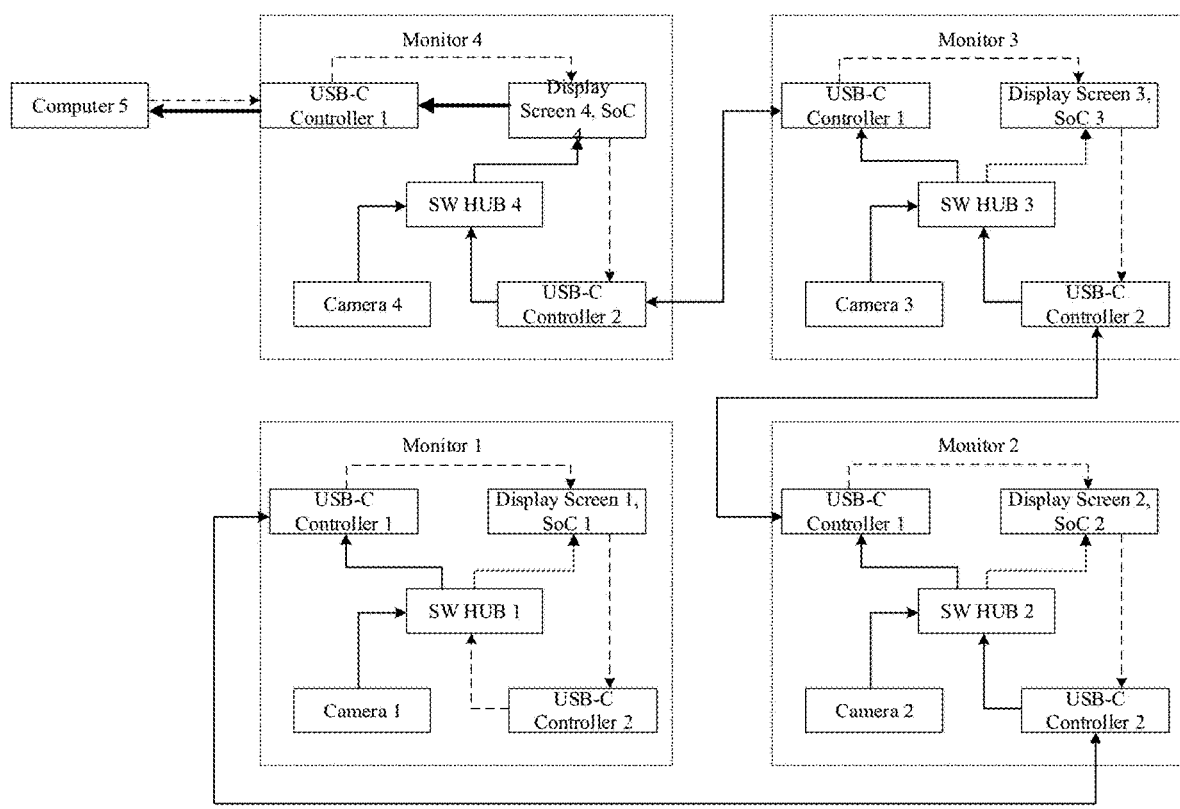
FIG. 5 is a schematic diagram of an architecture corresponding to FIG. 4.

FIG. 5 is a schematic diagram of an architecture corresponding to FIG. 4. As shown in FIG. 5, camera 1 of monitor 1 collects an image and sends the collected image 1 to the hub with a switch, SW HUB 1. SW HUB 1 sends image 1 to USB-C controller 1 of monitor 1. USB-C controller 1 of monitor 1 sends image 1 to USB-C controller 2 of Monitor 2. USB-C controller 2 of monitor 2 sends image 1 to SW HUB 2 of monitor 2. Camera 2 of monitor 2 collects an image, and sends the collected image 2 to SW HUB 2. SW HUB 2 sends image 1 and image 2 together to USB-C controller 1 of monitor 2. The USB-C controller 1 of monitor 2 sends image 1 and image 2 together to the USB-C controller 2 of monitor 3. The USB-C controller 2 of monitor 3 sends image 1 and image 2 together to the SW HUB 3 of monitor 3. Camera 3 of monitor 3 collects an image and sends the collected image 3 to SW HUB 3. SW HUB 3 sends image 1, image 2, and image 3 together to the USB-C controller 1 of monitor 3. USB-C controller 1 of monitor 3 sends image 1, image 2, and image 3 together to USB-C controller 2 of monitor 4. USB-C controller 2 of monitor 4 sends image 1, image 2, and image 3 together to SW HUB 4 of monitor 4. Camera 4 of monitor 4 collects an image, and sends the collected image to SW HUB 4. SW HUB 4 sends image 1, image 2, image 3, and the image collected by camera 4 to the processor SoC 4. SoC 4 merges image 1, image 2, image 3, and the image collected by camera 4 to obtain image 4, and sends image 4 to computer 5 through USB-C controller 1 of monitor 4.

The thick black line in FIG. 5 represents the merged image, which means that only monitor 4 in FIG. 5 performs image merging, and other monitors only perform image combination or forwarding. The dotted line represents the data sent from computer 5 to the monitors. The dotted line between a SW HUB and an SoC indicates that no data transfer is taking place therebetween.

Figure 6:
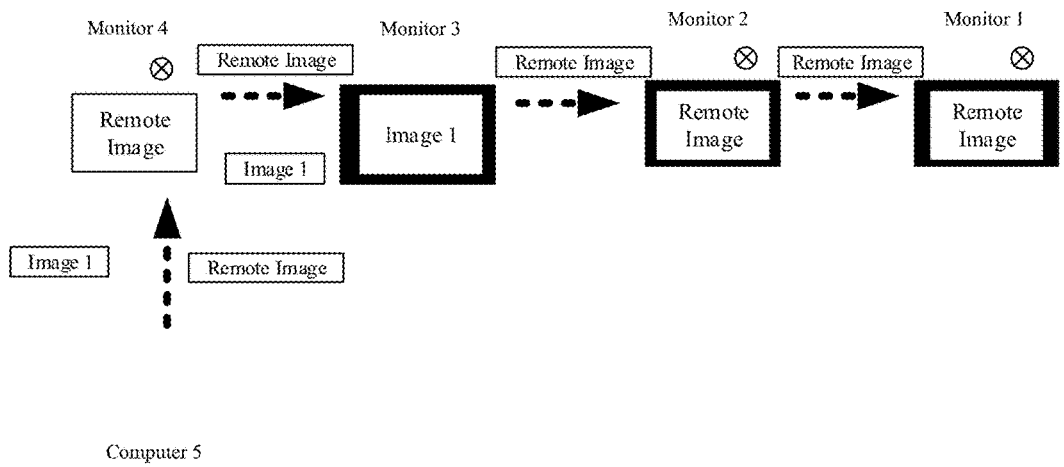
FIG. 6 is a schematic diagram of another application scenario of electronic devices, in accordance with embodiments of the present disclosure.

FIG. 6 is a schematic diagram of yet another application scenario of electronic devices, in accordance with embodiments of the present disclosure. As shown in FIG. 6, the electronic devices include four monitors, namely monitor 1, monitor 2, monitor 3, and monitor 4, where monitor 1, monitor 2, monitor 3, and monitor 4 are all connected in sequence through USB interfaces, and monitor 4 is also connected to computer 5 through a USB interface.

In some embodiments, each monitor has a camera through which image acquisition is possible. In FIG. 6, monitor 4 may receive a selection instruction sent by computer 5, and the selection instruction may include a device identifier. Based on the device identifier, monitor 4 determines that the camera of monitor 3 is the target object, and then sends an image acquisition instruction to monitor 3. Monitor 3 is caused to turn on the camera on monitor 3 to collect an image based on the image acquisition instruction. Monitor 3 sends the collected image 1 to monitor 4 (shown by the solid line in the figure), and monitor 4 then sends image 1 to computer 5. Computer 5 may send image 1 to a remote device (not shown) so that image 1 may output to display on the remote device.

In some embodiments, computer 5 may also receive a remote image (shown as a dotted line in the figure) sent by the remote device, and send the remote image to monitor 4. Monitor 4 outputs and displays the remote image through the display screen of monitor 4, and sends the remote image to monitor 3. Monitor 3 determines that the display screen of monitor 3 is currently in use according to the usage status information of the display screen of monitor 3. The remote image may be then directly sent to monitor 2 without displaying by monitor 3. Monitor 2 outputs and displays the remote image through the display screen of monitor 2, and also sends the remote image to monitor 1. Monitor 1 then outputs and displays the remote image through the display screen of monitor 1.

Through the cascaded monitors provided by the present disclosure, the computer may access the camera of any monitor in the cascaded monitors, so that the display screen of one of the monitors displays the local camera image, while the display screens of all other monitors display the remote image. In this way, the purpose of displaying different content on different display screens may be achieved.

Figure 7:
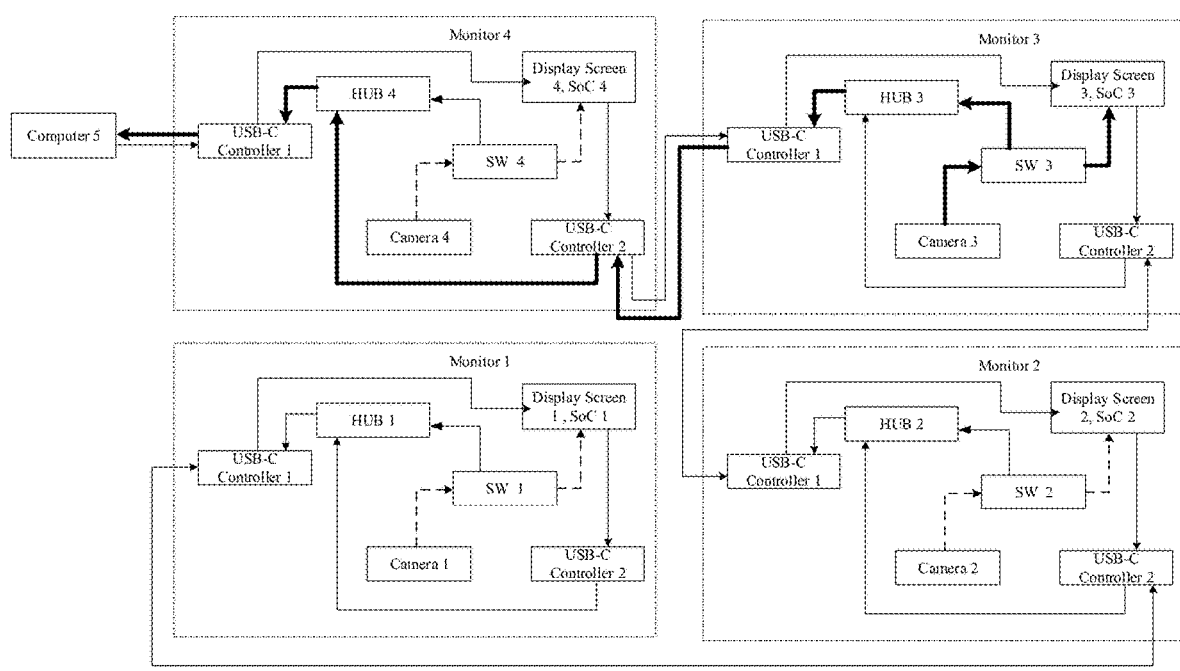
FIG. 7 is a schematic diagram of an architecture corresponding to FIG. 6.

FIG. 7 is a schematic diagram of an architecture corresponding to FIG. 6. As shown in FIG. 7, only the camera of monitor 3 is on (as indicated by the solid line). Camera 3 collects an image and sends the collected image 1 to switch SW 3 of monitor 3. SW 3 then sends image 1 to the hub HUB 3, and HUB 3 then sends image 1 to the USB-C controller 1 of monitor 3, and monitor 3 displays the output image 1 through monitor 3. At the same time, the USB-C controller 1 of monitor 3 sends image 1 to USB-C controller 2 of monitor 4. USB-C controller 2 of monitor 4 then sends image 1 to HUB 4 of monitor 4. HUB 4 of monitor 4 then sends image 1 to the USB-C controller 1 of monitor 4. The USB-C controller 1 of monitor 4 then sends image 1 to computer 5. In this way, only camera 3 of monitor 3 is in a working state, and display screen 3 may output and display the local image data collected by camera 3. In this way, the computer may select a camera of any monitor on the cascade linkage to realize image collection according to the needs.

In some embodiments, the cameras in monitor 1, monitor 2, and monitor 4 may be in the working state or in the non-working state. In FIG. 7, when the corresponding cameras in monitor 1, monitor 2, and monitor 4 are in the working state, an image collected by a camera may be sent to the corresponding SoC through the corresponding SW, but is not sent outwards (as indicated by the dotted line).

In FIG. 7, computer 5 may also send a remote image to the USB-C controller 1 of monitor 4. The USB-C controller 1 of monitor 4 sends the remote image to the processor SoC4 of monitor 4. The processor SoC4 sends the remote image to the USB-C controller 2 and display screen 4 of monitor 4, and outputs and displays the remote image through display screen 4. The remote image is also sent to the SoC 3 of monitor 3 through the USB-C controller 2 of monitor 4. SoC3 then forwards the remote image to USB-C controller 1 of monitor 2 through USB-C controller 2 of monitor 3. USB-C controller 1 of monitor 2 sends the remote image to display screen 2 and SoC2 of monitor 2, and outputs and displays the remote image through display screen 2. SoC2 of monitor 2 also forwards the remote image through to USB-C controller 1 of monitor 1 through USB-C controller 1 of monitor 2. The USB-C control of monitor 1 of monitor 1 sends the remote image to the display screen 1 of monitor 1 to output and display the remote image through the display screen 1. In this way, except that monitor 3 displays the local image, monitors 1, 3, and 4 all display the remote image. This achieves the effect of displaying different content from different devices on the display screens.

Through device cascading, while realizing image collection through its own image acquisition unit, an electronic device provided by the present disclosure may receive image data sent by an upper-level device and/or send image data collected by its own image acquisition unit and/or image data sent by the upper-level device to a lower-level device. In this way, users' needs for using images collected by multiple cameras may be met. In addition, the computer connected to the cascade devices may also select any camera on a cascade linkage device to collect an image, so that in a video conference scenario, the remote device may display an image collected by any camera. The displayed image range is no longer limited to a specific device.

Figure 8:
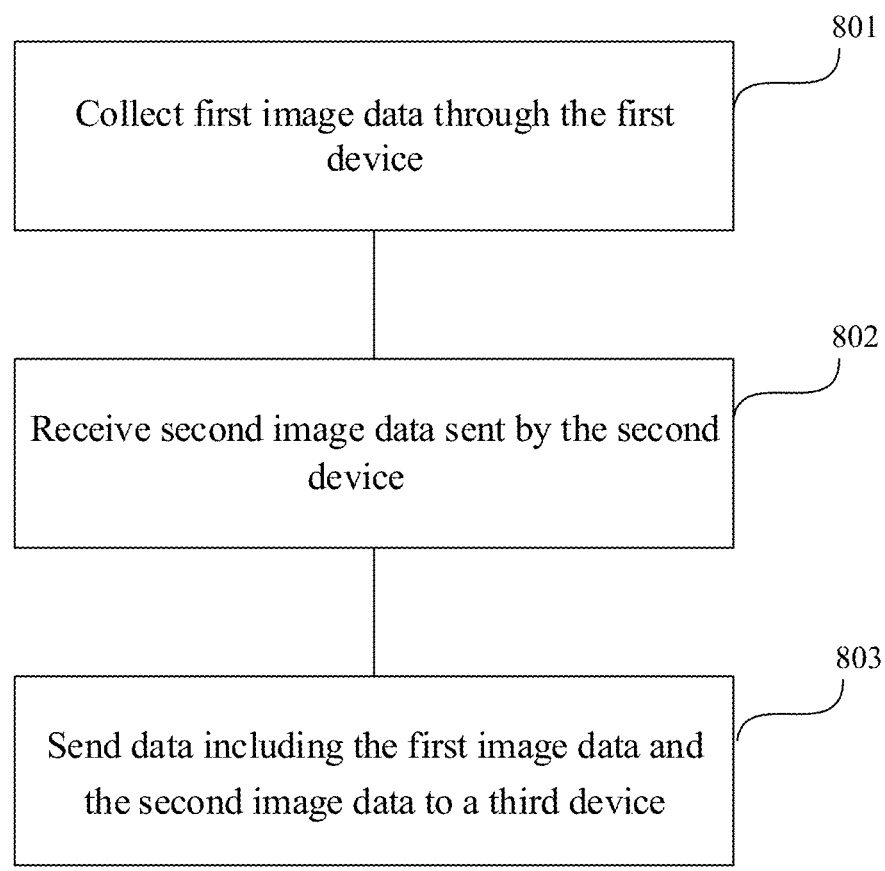
FIG. 8 is a flow chart of a processing method, in accordance with embodiments of the present disclosure.

FIG. 8 is a flow chart of a processing method, in accordance with embodiments of the present disclosure. The method may be applied to the first device. As shown in FIG. 8, the method includes:

Step 801: Collect first image data through a first device.

In some embodiments, the first device may be a monitor, and the monitor may have an image acquisition unit through which first image data may be collected.

Step 802: Receive second image data sent by a second device.

In some embodiments, the first device may have a first interface through which it may be connected to the second device to receive the second image data sent by the second device. In some embodiments, the second image data may be image data collected by the image acquisition unit of the second device, or the second device may receive a collected image sent from the fourth device. In some embodiments, the second image data may be an independent image or a combined image of multiple independent images.

Step 803: Send data including the first image data and the second image data to a third device.

In some embodiments, the first device may have a second interface through which data including the first image data and the second image data may be sent to the third device.

In some embodiments, the first device may merge or combine the first image data and the second image data to generate third image data, and send the third image data to the third device through the second interface.

In some embodiments, the first device, the second device, the third device, and the fourth device may be connected in series, or the second device, the third device, and the fourth device may all be directly connected to the first device.

In some embodiments, the first device may also receive the display data sent by the third device through the second interface, and output the display data through its own display screen. Apparently, the first device may also send at least part of the display data to the second device through the first interface, or send at least part of the display data to the fourth device through the second device.

Apparently, the data displayed by the first device through its own display screen may also have the same content as the data output by the second device and the fourth device.

In some embodiments, the first device, the second device, and the fourth device may all be monitors, and the third device may be a computer device with a CPU.

It should be noted that the processing method in the embodiments disclosed herein may be based on the same concept as the above-described first device embodiments. The specific implementation process may refer to the descriptions in the device embodiments, details of which will not be described again here.

In the embodiments provided in the present disclosure, it should be understood that the disclosed devices and methods may be implemented in other ways. The device embodiments described above are merely for illustrative purposes. For example, the division of the devices may be a logical function division. In actual embodiments, there may be other division methods. For example, multiple devices or components may be combined, or may be integrated into another system, or some features may be ignored, or not implemented. In addition, the coupling, direct coupling, or communication connection between the components shown or discussed may be through some interfaces, and the indirect coupling or communication connection of the devices or units may be electrical, mechanical, or in other forms.

The units described above as separate components may or may not be physically separated. The components shown as units may or may not be physical units, that is, they may be located in one place or distributed to multiple network units. Some or all of the units may be selected according to actual needs to achieve the purpose of the solution of the present disclosure.

The features disclosed in several product embodiments provided in the present disclosure may be combined arbitrarily without conflict to obtain new product embodiments.

The features disclosed in several device embodiments provided in the present disclosure may be arbitrarily combined to obtain new device embodiments without conflict.

The above are merely some specific embodiments of the present disclosure, but the protection scope of the present disclosure is not limited thereto. A person skilled in the art may easily derive changes or substitutions within the technical scope disclosed in the present disclosure, which should fall within the protection scope of the present disclosure. Accordingly, the protection scope of the present disclosure is also subject to the protection scope of the claims.

What is claimed is:

1. A first device, comprising:
- an image acquisition unit, configured to acquire first image data;
- a first interface, configured to connect with a second device and receive at least second image data sent by the second device, wherein the second image data includes image data collected by an image acquisition unit of the second device;
- a second interface, configured to connect with a third device and send data including at least the first image data and the second image data to the third device; and
- an image output unit;

wherein:
- the second interface is further configured to send data including the first image data and the second image data to the third device and receive first display data sent by the third device so that the first display data is displayed on the image output unit; and
- the first interface is further configured to receive the second image data sent by the second device and send second display data to the second device, so that the second display data is displayed on an image output unit of the second device, wherein the first display data includes the second display data.

2. The first device according to claim 1, further comprising:
- a processor, configured to merge or combine the first image data and the second image data to obtain third image data,
- wherein the second interface is configured to send at least the third image data to the third device.

3. The first device according to claim 2, wherein the second image data include combined data of the image data collected by the image acquisition unit of the second device and image data received by the second device and sent from a fourth device, and the image data sent by the fourth device includes at least image data collected by an image acquisition unit of the fourth device; and
- the processor is further configured to merge the first image data, the image data collected by the image acquisition unit of the second device, and the image data collected by the image acquisition unit of the fourth device to obtain the third image data.

4. The first device according to claim 3, wherein the image data sent by the fourth device include combined data of the image data collected by the image acquisition unit of the fourth device and image data sent by a fifth device and received by the fourth device, and the image data sent by the fifth device at least includes image data collected by an image acquisition unit of the fifth device; and
- the processor is further configured to merge the first image data, the image data collected by the image acquisition unit of the second device, the image data collected by the image acquisition unit of the fourth device, and the image data collected by the image acquisition unit of the fifth device to obtain the third image data.

5. A first device, comprising:
- an image acquisition unit, configured to acquire first image data;
- a first interface, configured to connect with a second device and receive at least second image data sent by the second device, wherein the second image data includes image data collected by an image acquisition unit of the second device;
- a second interface, configured to connect with a third device and send data including at least the first image data and the second image data to the third device; and
- a selection unit, configured to determine a target device among a plurality of candidate devices in response to a selection instruction, the candidate devices at least including the first device, the second device, and a fourth device connected to the second device, wherein the second image data include combined data of the image data collected by the image acquisition unit of the second device and image data sent by the fourth device, and the image data sent by the fourth device includes at least image data collected by an image acquisition unit of the fourth device,
- wherein the second interface is configured to send image data corresponding to the target device to the third device.

6. The first device according to claim 5, wherein the second interface is further configured to receive a selection instruction sent by the third device, and the selection instruction at least carries a device identifier; and
- the first interface is further configured to send an image acquisition instruction to the second device based on the device identifier, so that the second device performs image acquisition through the image acquisition unit of the second device based on a device identifier included in the image acquisition instruction.

7. The first device according to claim 5, wherein the second interface is further configured to receive a selection instruction sent by the third device, and the selection instruction at least carries a device identifier; and
- the first interface is further configured to send an image acquisition instruction to the fourth device, so that the fourth device performs image acquisition through the image acquisition unit of the fourth device based on a device identifier included in the image acquisition instruction.

8. The first device according to claim 1, wherein the first display data includes a plurality of sub-display data, each sub-display data having a corresponding identifier used to indicate a display order of each sub-display data on a corresponding device; and
- the first device further comprises:
- a processor configured to determine first sub-display data among the plurality of sub-display data based on the identifier of each sub-display data.

9. The first device according to claim 8, wherein the image output unit of the first device is further configured to display the first sub-display data.

10. The first device according to claim 9, wherein the first interface is further configured to send remaining sub-display data of the plurality of sub-display data except for the first sub-display data to the second device, so that the second device displays corresponding second sub-display data in the remaining sub-display data through the image output unit of the second device based on the identifier of each sub-display data.

11. The first device according to claim 9, wherein the first interface is further configured to send remaining sub-display data of the plurality of sub-display data except for the first sub-display data to a fourth device connected to the second device, so that the fourth device displays corresponding third sub-display data in the remaining sub-display data through an image output unit of the fourth device based on the identifier of each sub-display data.

12. A processing method applied to a first device, comprising:
- collecting first image data through the first device;
- receiving second image data sent by the second device;
- sending data including the first image data and the second image data to a third device; and
- receiving first display data sent by the third device so that the first display data is displayed on an image output unit; and
- receiving the second image data sent by the second device and sending second display data to the second device, so that the second display data is displayed on an image output unit of the second device, wherein the first display data includes the second display data.

13. The method according to claim 12, further comprising:
- in response to a selection instruction, determining a target device among a plurality of candidate devices, where the target device includes the first device, the second device, and a fourth device connected to the second device; and
- sending image data corresponding to the target device to the third device.

14. The method according to claim 12, wherein sending data including the first image data and the second image data to a third device comprises:
- merging or combining the first image data and the second image data to obtain third image data; and
- sending at least the third image data to the third device.

15. The method according to claim 14, wherein the second image data include combined data of the image data collected by an image acquisition unit of the second device and image data received by the second device and sent from a fourth device, and the image data sent by the fourth device includes at least image data collected by an image acquisition unit of the fourth device; and
- the method further comprises merging the first image data, the image data collected by the image acquisition unit of the second device and the image data collected by the image acquisition unit of the fourth device to obtain the third image data.

16. The method according to claim 12, further comprising:
- determining a target device among a plurality of candidate devices in response to a selection instruction, the candidate devices at least including the first device, the second device, and a fourth device connected to the second device, wherein the second image data include combined data of image data collected by an image acquisition unit of the second device and image data sent by the fourth device, and the image data sent by the fourth device includes at least image data collected by an image acquisition unit of the fourth device; and
- sending image data corresponding to the target device to the third device.

17. The method according to claim 16, further comprising:
- receiving a selection instruction sent by the third device, and the selection instruction at least carries a device identifier; and sending an image acquisition instruction to the second device based on the device identifier, so that the second device performs image acquisition through the image acquisition unit of the second device based on a device identifier included in the image acquisition instruction.

18. The method according to claim 16, further comprising:
receiving a selection instruction sent by the third device, and the selection instruction at least carries a device identifier; and
sending an image acquisition instruction to the fourth device, so that the fourth device performs image acquisition through the image acquisition unit of the fourth device based on a device identifier included in the image acquisition instruction.

19. A non-transitory computer-readable storage medium storing instructions that, when executed by one or more processors, cause the one or more processors to:
collect first image data through a first device;
receive second image data sent by the second device;
send data including the first image data and the second image data to a third device; and
receive first display data sent by the third device so that the first display data is displayed on an image output unit; and
receive the second image data sent by the second device and send second display data to the second device, so that the second display data is displayed on an image output unit of the second device, wherein the first display data includes the second display data.

* * * * *